United States Patent
Yang et al.

(10) Patent No.: US 11,164,289 B1
(45) Date of Patent: Nov. 2, 2021

(54) METHOD FOR GENERATING HIGH-PRECISION AND MICROSCOPIC VIRTUAL LEARNING RESOURCE

(71) Applicant: Central China Normal University, Hubei (CN)

(72) Inventors: Zongkai Yang, Hubei (CN); Zheng Zhong, Hubei (CN); Di Wu, Hubei (CN)

(73) Assignee: Central China Normal University, Wuhan (CN)

( * ) Notice: Subject to any disclaimer, the term of this patent is extended or adjusted under 35 U.S.C. 154(b) by 0 days.

(21) Appl. No.: 17/371,074

(22) Filed: Jul. 8, 2021

(30) Foreign Application Priority Data

Sep. 10, 2020 (CN) .................. 202010946194.X

(51) Int. Cl.
| G06T 3/40 | (2006.01) |
| G06T 7/50 | (2017.01) |
| G06N 20/00 | (2019.01) |
| G06T 15/04 | (2011.01) |

(52) U.S. Cl.
CPC .......... *G06T 3/4038* (2013.01); *G06N 20/00* (2019.01); *G06T 7/50* (2017.01); *G06T 15/04* (2013.01); *G06T 2207/20182* (2013.01)

(58) Field of Classification Search
CPC ......... G06T 3/4038; G06T 15/04; G06T 7/50; G06T 2207/20182; G06N 20/00
See application file for complete search history.

(56) References Cited

U.S. PATENT DOCUMENTS

2017/0367771 A1* 12/2017 Tako ............... A61B 34/20

FOREIGN PATENT DOCUMENTS

| CN | 104200762 A | 12/2014 |
| CN | 104785947 A | 7/2015 |
| CN | 106943192 A | 7/2017 |
| CN | 206301505 U | 7/2017 |
| CN | 108182725 A | 6/2018 |
| CN | 109035395 A | 12/2018 |
| CN | 109229417 A | 1/2019 |
| CN | 110124309 A | 8/2019 |
| CN | 110302171 A | 10/2019 |
| CN | 110992804 A | 4/2020 |
| CN | 111260677 A | 6/2020 |
| CN | 111590901 A | 8/2020 |

OTHER PUBLICATIONS

Bernardo, A., 2017. Virtual reality and simulation in neurosurgical training. World neurosurgery, 106, pp. 1015-1029.*
Augusto, I., Monteiro, D., Girard-Dias, W., Dos Santos, T.O., Rosa Belmonte, S.L., Pinto de Oliveira, J., Mauad, H., da Silva Pacheco, M., Lenz, D., Stefanon Bittencourt, A. and Valentim Nogueira, B., 2016. Virtual reconstruction and three-dimensional printing of blood cells as a tool in cell biology education. PI.*

(Continued)

*Primary Examiner* — Zhitong Chen

(57) ABSTRACT

A method for generating a high-precision and microscopic virtual learning resource includes acquisition of high-definition specimen images, generation of a 3D model of a surface a specimen and interactive display of a microscopic virtual learning resource.

1 Claim, 7 Drawing Sheets

(56) References Cited

OTHER PUBLICATIONS

Farahani, N., Braun, A., Jutt, D., Huffman, T., Reder, N., Liu, Z., Yagi, Y. and Pantanowitz, L., 2017. Three-dimensional imaging and scanning: current and future applications for pathology. Journal of pathology informatics, 8.*
Northton; Three-dimensional scanning case of animal specimens; May 10, 2017; Northton Measurement Technology (Beijing) Co., Ltd.
Li, Dian; Surface Roughness Three-Dimensional Detection Based on SFS; Apr. 15, 2019.

* cited by examiner

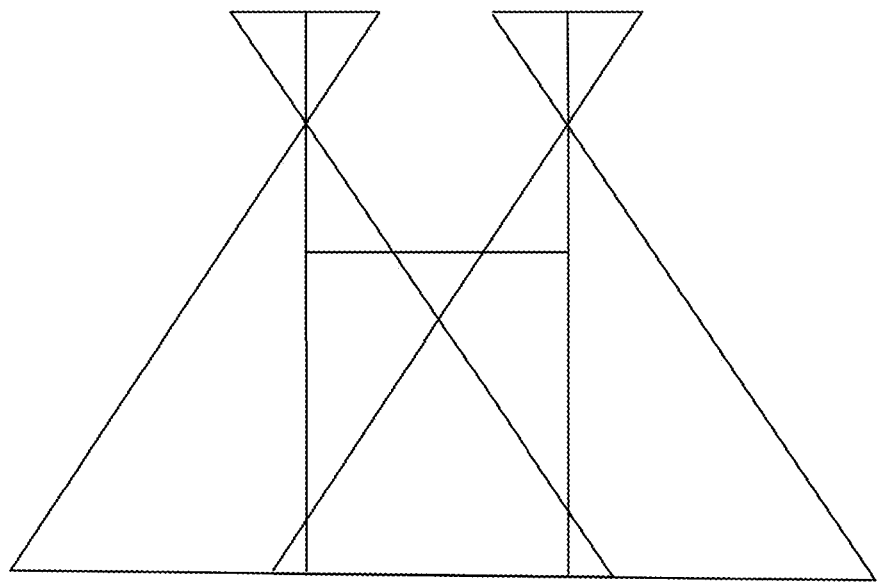
FIG. 2
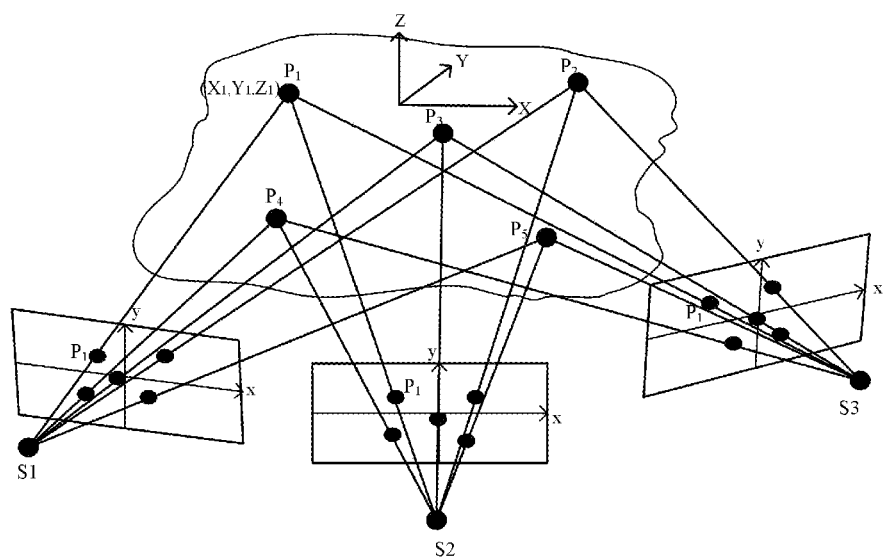
FIG. 3
| 1 | 2 | 3 |
|---|---|---|
| 4 | p | 5 |
| 6 | 7 | 8 |
FIG. 4

METHOD FOR GENERATING HIGH-PRECISION AND MICROSCOPIC VIRTUAL LEARNING RESOURCE

CROSS-REFERENCE TO RELATED APPLICATIONS

This application claims the benefit of priority from Chinese Patent Application No. 202010946194.X, filed on Sep. 10, 2020. The content of the aforementioned application, including any intervening amendments thereto, is incorporated herein by reference in its entirety.

TECHNICAL FIELD

This application relates to virtual reality (VR)-based teaching methods, and more particularly to a method for generating a high-precision and microscopic virtual learning resource.

BACKGROUND

It has been feasible to explore the microscopic world that was previously inaccessible due to the development and use of observation instruments such as microscopes and lasers. Many researches in basic subjects such as physics, chemistry, biology, and materials have shifted from macro to micro. With the help of a microscopic technique, the surface texture of small plants, animals or microorganisms can be magnified to 100 times with an accuracy up to 1 mm. However, it is difficult to distinguish all surface textures of a micron-scale or a nano-scale structure due to the limit of extremely shallow depth of field, thereby affecting the reconstruction of a virtual learning resource of a microscopic specimen. The virtual reality (VR) technology has characteristics of interaction immersion and imagination, and can be applied to build an invisible and imperceptible microscopic world to break through the limitations of time and space. Moreover, by means of a visualization device, a sensor and an interactive device or corresponding technologies, a learner can browse the virtual learning resources from multiple scales and angles, thereby not only promoting the deep exploration of microscopic morphology, composition and structure of a matter, but also facilitating assisting the learner to understand the rule governance and regulation phenomena that the matter is subject to in the microscopic world and scale effect, reaction mechanism and movement pattern at different scales. The development of $5^{th}$-generation (5G) network environment and the optimization of the cloudification capability of graphics processing unit (GPU) are beneficial to the maturity of application scenarios and technical support conditions of a high-precision and microscopic virtual learning resource. Therefore, the high-precision and microscopic virtual learning resource will have a brilliant prospect in an information-based and three-dimensional (3D) teaching environment.

The 3D laser scanning technology has been widely used to reconstruct 3D models of specimens, such as large animals (e.g., dinosaurs, lions and tigers) and vegetation (e.g., trees). However, due to the limit in accuracy, a 3D laser scanner has difficulty in obtaining point cloud data of a microscopic specimen. Currently, an ultra-depth 3D microscope is capable of clearly distinguishing a surface texture of 0.1 nm. Though the equipped 3D reconstruction software can vividly reproduce the texture structure of a specimen model, the rasterized modeling result is difficult to be used for the construction of the microscopic virtual learning resource since it fails to add annotations and create an interactive 3D surface structure.

SUMMARY

An object of this disclosure is to provide a method for generating a high-precision and microscopic virtual learning resource to overcome the defects in the prior art, which provides a new and rapid method to build a virtual reality (VR) teaching resource in different teaching scenarios.

Technical solutions of this disclosure are described as follows.

This application provides a method for generating a high-precision and microscopic virtual learning resource, comprising:

(1) adopting a combination of ultra-depth-of-field three-dimensional (3D) microscopy and macro photography to realize framing and continuous image acquisition of a specimen to vividly reconstruct microscopic morphology and structure of a surface of the specimen; photographing the specimen from multiple angles according to requirements of overlapping photography, so as to realize registration and stitching of images based on an overlapping area to obtain a panoramic image of the surface of the specimen; describing collection information of the specimen in a form of metadata and regularly naming the images of the specimen; organizing and managing image files of the specimen by using a pyramid image system to facilitate subsequent 3D reconstruction based on the images;

(2) matching and correcting the images of the specimen; calibrating a camera in a spatial scene; generating point cloud data of the specimen based on 3D image construction; removing noise points from a point cloud; allowing a spatial coordinate of the point cloud to be in one-to-one correspondence to a texture coordinate based on a direct linear transformation adjustment model; comparing a coordinate and a position of control points to check generation quality of the point cloud data; constructing a triangular surface model of the point cloud by adopting a 3D Delaunay algorithm; segmenting the specimen model along a contour of each sub-component, and compressing the number of faces by performing a simplified algorithm for quadratic local mapping; and registering a mapping relationship between a surface vertex and the panoramic image to generate a 3D surface model of the specimen with image texture; and (3) selecting a 3D insect model as a user avatar; viewing different parts of the specimen model in a multi-angle and omni-directional manner from a third-person perspective in a virtual learning environment to support interactive display modes of single-sided transparency, cross-sectional display and components' hiding; setting different annotation display schemes according to a sequence of the components and visual relationship; splitting a model resource into functional components and restoring a hierarchical relationship between the functional components according to an actual structure; displaying morphology and structure of the specimen model according to an interaction task and step; and dynamically displaying each functional component layer by layer and segment by segment according to a stripping order from a root up and from outside to inside.

Compared to the prior art, this disclosure has the following beneficial effects.

A combination of ultra-depth-of-field 3D microscopy and macro photography is adopted to acquire from multiple angles high-resolution images of a microscopic specimen model. There is an overlapping area between adjacent images. Registration of the images according to the overlapping area is performed to obtain the panoramic image of the surface of the specimen. Image files of the specimen are organized and managed by using a pyramid image system. The images of the specimen is matched and corrected, a camera is calibrated in a spatial scene and point cloud data of the surface of the specimen is generated. The point cloud data is subjected to elimination of noise point, point cloud coloring and quality control. A 3D surface model of the point cloud is generated by adopting a 3D Delaunay algorithm followed by subjecting to segmenting, compressing and texture mapping, so as to generate a 3D surface model of the specimen with image texture. A 3D insect model is selected as an avatar of a learner. Different parts of the specimen model are viewed from a third-person perspective. The specimen model and different annotation display schemes are set. Morphology and structure of each functional component of the specimen model are displayed according to an interaction task and step. The specimen model is dynamically displayed layer by layer and segment by segment according to a stripping order from a root up and from outside to inside.

The method provided herein for generating a high-precision and microscopic virtual learning resource promotes the popularization of a VR teaching resource in different teaching scenes.

BRIEF DESCRIPTION OF THE DRAWINGS

FIG. 2 schematically shows overlapping photography according to an embodiment of the present disclosure.

FIG. 3 schematically illustrates multi-viewpoint imaging according to an embodiment of the present disclosure.

FIG. 4 is a schematic diagram of a matching window according to an embodiment of the present disclosure.

DETAILED DESCRIPTION OF EMBODIMENTS

The present disclosure will be further described in detail below with reference to the embodiments and the accompanying drawings to make objects, technical solutions and advantages of the present disclosure better understood. It should be understood that the embodiments presented in the accompanying drawings are merely illustrative of the disclosure, and are not intended to limit the present disclosure.

Figure 1:
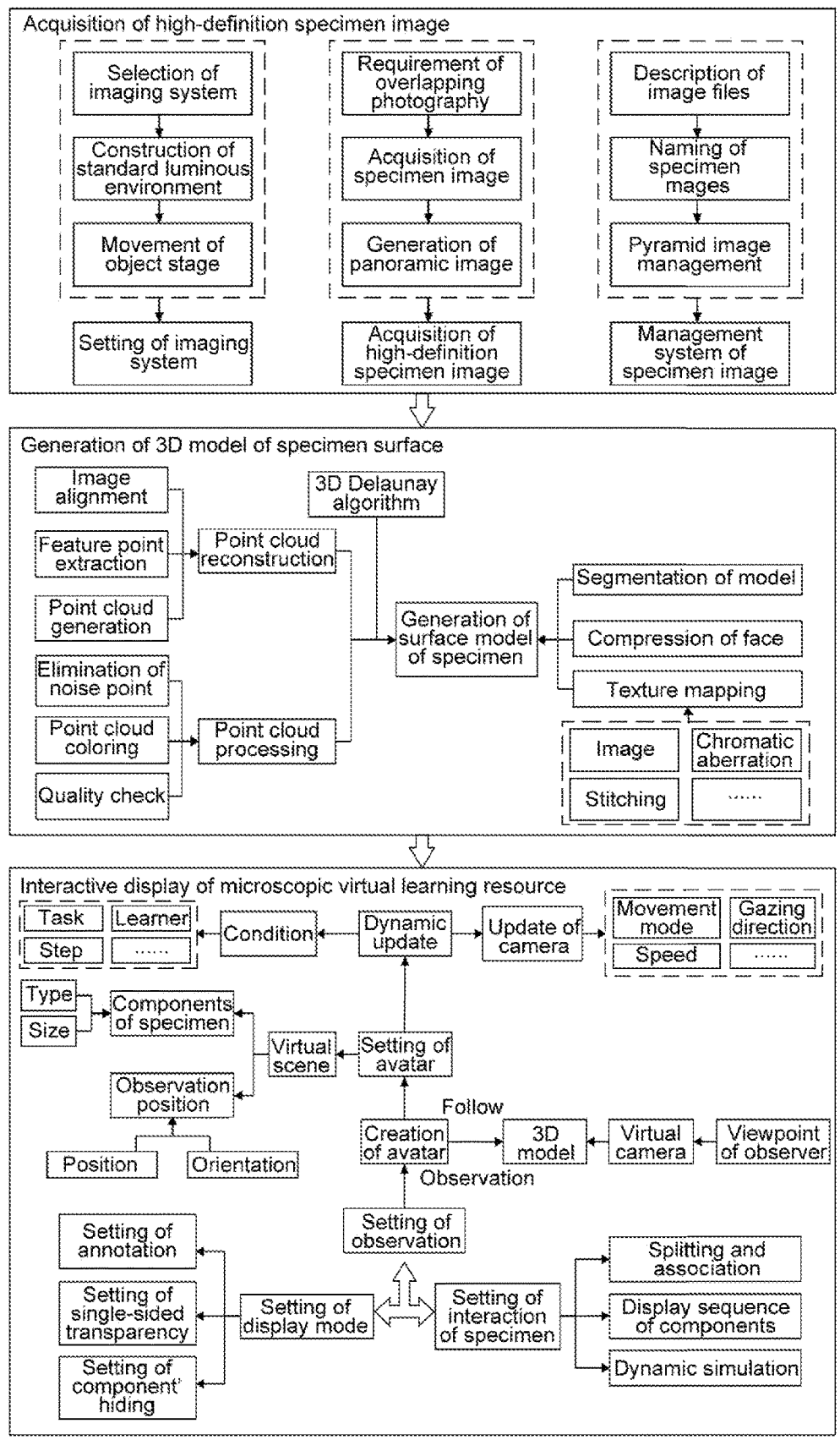
FIG. 1 is a flow chart of a method for generating a high-precision and microscopic virtual learning resource according to an embodiment of the present disclosure.

As shown in FIG. 1, this application provides a method for generating a high-precision and microscopic virtual learning resource.

(1) Acquisition of High-Definition Specimen Image (1.1) Setting of Imaging System A microscope is selected according to an optical zoom, and a standard luminous environment is constructed in order to vividly reconstruct the microscopic morphology and structure of a surface of a specimen. A high-torque and low-speed motor is adopted to control regular movements of an object stage, so as to realize framing and continuous image acquisition of the specimen.

(1.1.1) Selection of Imaging System

An industrial microscope with the optical zoom of 20-280 and an observation accuracy of around 10 μm is selected according to requirements for high-precision silicon and metal processing in chip manufacturing industry to meet requirements for observation of fine structure on the surface of the specimen.

(1.1.2) Construction of Standard Luminous Environment

A color temperature standard modeling lamp (Broncolor Protecting Glass (5500K)) is adopted as a coaxial light source and a flash cut-off technology is configured to ensure light consistency, so as to achieve shadowless lighting effect and clearly show detailed texture on the surface of the specimen.

(1.1.3) Regular Movement of Object Stage

The object stage is driven by the high-torque and low-speed motor to move regularly on a slide rail composed of a gear structure and a screw, where a movement accuracy depends on a coupling ratio between gears, and theoretically reaches 1 μm.

(1.2) Acquisition of High-Definition Specimen Image

The specimen is photographed from multiple angles at a certain frequency according to requirements of overlapping photography using an ultra-depth three-dimensional (3D) microscopy to ensure that there is an overlapping area between adjacent images. Registration of the images is performed according to the overlapping area to obtain a panoramic image of the surface of the specimen.

(1.2.1) Requirement of Overlapping Photography

During movement of the object stage, the surface of the specimen is photographed at a certain frequency from vertical, inclined and adjacent directions, respectively. A proportion of the overlapping area between the adjacent images along a front-rear direction is generally 60%-65%, and the maximum is not larger than 75% and the minimum is not less than 56%. A proportion of the overlapping area on left and right sides is generally 30%-35%, and the maximum is not larger than 13%. The imaging form of the overlapping photography of the images is presented in FIG. 2.

(1.2.2) Acquisition Process of Specimen Image

According to the requirements of the overlapping photography, an ultra-depth 3D microscopic system is adopted focus on different areas of the specimen by regularly moving the object stage so as to collect information of microscopic details on the specimen. Color control and color calibration are performed in a professional-grade graphics monitor with a color space of no less than 10 bits.

(1.2.3) Generation of Panoramic Image of Specimen

According to content of the overlapping area between the adjacent images, a plurality of images of the specimen with different focal planes are effectively registered to stitch the adjacent images, thereby iteratively completing stitching of all images. A color equalization algorithm is adopted to generate the complete panoramic image of the specimen considering chromatic aberration of the images caused by different factors (1.3) Management of Specimen Image The collection information of the specimen images is described in the form of metadata. The specimen images are named according to a rotation angle of the object stage and a photographing position. Image files of the specimen are organized and managed by using a pyramid image system to facilitate subsequent image-based 3D reconstruction (1.3.1) Description of Image File A position, an angle and a magnification factor of each image file of the specimen are stored during a photographing process in a database table. Names and overlapping information of overlapping files in forward and left-right directions during a collection process are recorded. Description of overlapping information recorded in the image files adjacent to the overlapping files is updated (1.3.2) Naming of Specimen Image According to a sequence of moving of the object stage, the image files of the specimen are named based on a sequence of a photographing position, a photographing angle and a magnification factor. The image files are regularly described to facilitate data preprocessing of subsequent matching of points with the same name in generation of the panoramic image and the point cloud, where the points with the same name are the same feature points in different images.

(1.3.3) Management of Specimen Image

A specimen image management system is established according to an order of magnification from large to small. The specimen images with different magnifications are organized and managed by using the pyramid image system to realize the organization and management of the specimen images, where a small-scale (low magnification) image is at a top level and a large-scale (high magnification) image is at a bottom level.

(2) Generation of 3D Model of Specimen Surface (2.1) Generation of Point Cloud Data The image files of the specimen are organized in a form of tile and all images are automatically arranged in a spatial scene to complete calibration of the camera. According to feature points with the same name on adjacent images of the specimen, the specimen images are corrected and a parallax is calculated. 3D point cloud data of the surface of the specimen is generated according to a compression parameter using an iterative point cloud compression algorithm. The iterative point cloud compression algorithm takes the morphology of the specimen and a density distribution into account;

(2.1.1) Image Alignment

In the specimen image management system, all specimen images are selected and organized in the form of tile to achieve matching of the specimen images. An accuracy parameter is set according to high, medium and low levels. An alignment operation is performed to automatically arrange all images in the spatial scene to complete the calibration of the camera. Display effect of a restored multi-viewpoint imaging is presented in FIG. 3.

(2.1.2) Feature Point Extraction

Considering a perspective transformation, a similarity transformation and a shear transformation between the feature points with the same name in the adjacent images, the specimen images are corrected according to spatial position and similarity rule. The parallax between the adjacent images is calculated based on matching of a dense point of a window. As shown in FIG. 4, a maximum parallax of all matching points is a and a minimum parallax is b. The parallax of a matching point p is d, and a gray value of the matching point p in a parallax graph is expressed as:

$$V_p = 255 \times \frac{|d-b|}{|a-b|}.$$

(2.1.3) Generation of Dense Point Cloud

Figure 5:
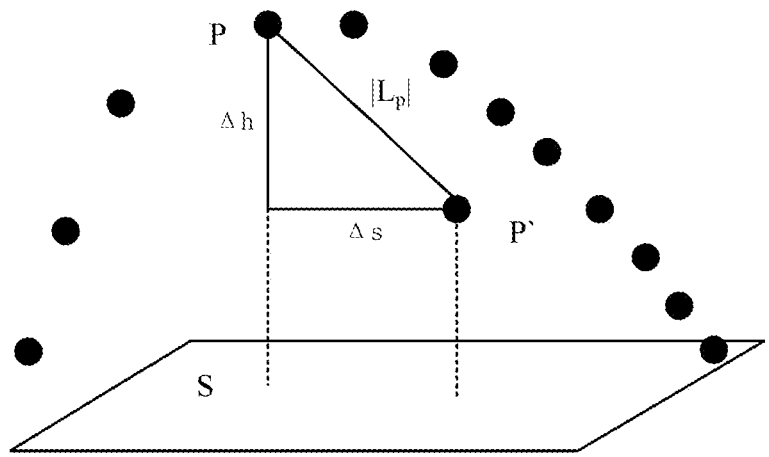
FIG. 5 schematically shows a spatial relationship of distribution of point clouds according to an embodiment of the present disclosure.

In a unified coordinate system, spatial coordinates (X, Y, Z) of all feature points with the same name are obtained. A K-dimensional (K-D) tree is configured to establish a topology relationship of the point cloud, and a Gaussian smoothing algorithm is configured to calculate a neighborhood set $N_p$ of the matching point p, where K is assigned to 40, 30, 20, 10 and 5, respectively according to the compression parameter from low to high, consisting of ultra low, low, medium, high and ultra high. After obtaining a prediction point p' of the matching point p by the Gaussian smoothing algorithm, displacement |Lp| of the matching point p before and after smoothing is calculated according to the follow formula expressed as:

$$|Lp|=\|p-p'\|,$$

Where Lp is a vector from the matching point p to the prediction point p'. The displacement |Lp| is determined by the following two distance factors: variation in flatness Δh and density variation Δs. The two variations are caused by changes of geometrical morphology in the neighborhood of the current point p. The variation in flatness Δh relative to a local reference plane is caused by fluctuation variation, and the density variation Δs is caused by uneven distribution of points in the neighborhood of the point p. The displacement |Lp|, the variation in flatness Δh and the density variation Δs accords with a relationship of a right triangle in space. As shown in FIG. 5, s is the local reference plane, p' is the prediction point. Point-cloud compression considering the geometrical morphology and the density distribution is achieved and the 3D point cloud data on the specimen surface is generated by using the Gaussian smoothing algorithm.

(2.2) Processing of Point Cloud Data

Noise data is eliminated by using a point cloud denoising algorithm based on local density. A coefficient of coordinate transformation between a space coordinate system and an image coordinate system is solved based on the direct linear transformation adjustment model to obtain the mapping relationship between the 3D coordinate of the point cloud and the texture coordinate. Coordinates and positions of the control points are measured by using a 3D interactive software through the control points of the specimen. The generation quality of the point cloud data is checked.

(2.2.1) Elimination of Noise Point

Occurrence of the noisy point in the generated point cloud is caused by shooting angle, mutual occlusion of components of the specimen and material and texture distribution.

A topological relationship of the point cloud is constructed by using the K-D tree to determine K near neighbors of each point p (K points that are the smallest distance from p). Distances from the point p to the K near neighbors are calculated, respectively denoted as $S_{i1}, S_{i2}, \ldots, S_{iK}$. An average distance from the point p to the K near neighbors is calculated through $$\overline{S_i} = \frac{(S_{i1} + S_{i2} + \ldots + S_{1K})}{K}.$$

An average distance and a standard deviation from all points to corresponding K near neighbors are calculated through $$\mu = \frac{(\overline{S_1} + \overline{S_2} + \ldots + \overline{S_n})}{n}$$

and $$\sigma = \sqrt{\frac{\sum_{i=1}^{n}(\overline{S_i} - \mu)^2}{n}},$$

respectively. When an average distance $\overline{S}_i$ from a point to K near neighbors is greater than $\mu + m\sigma$, the point is identified as a noisy point. The noisy point is eliminated.

(2.2.2) Point Cloud Coloring

According to results of the alignment of multiple points of sight true color images completed by step (2.1.1), the coefficient is solved by using the direct linear transformation adjustment model and a geometric relationship of coordinates of the control points in the space coordinate system and the image coordinate system is established. A true color orthophoto of color texture is made based on a transformation relationship between a row-column coordinate and a plane coordinate in the image coordinate system. The image coordinate of each point in the point cloud is calculated to assign a corresponding RGB values to individual points in the point cloud.

(2.2.3) Quality Check

The coordinate of the control point and distance and azimuth between the control points are measured by using distance measurement function of the 3D editing interactive software. A generation accuracy of the point cloud is determined by comparing corresponding actual information of the specimen. if the generation accuracy does not meet the requirements, look for wrong parts, and if the point cloud data is incomplete, supplement data of a missing part.

(2.3) Generation of Model

Figure 6:
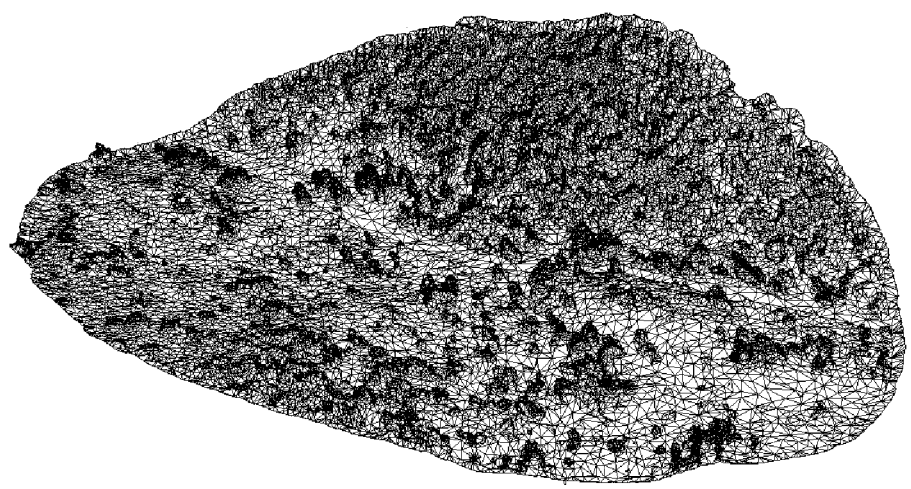
FIG. 6 is a schematic diagram of a triangular network model of a local surface of a specimen according to an embodiment of the present disclosure.
Figure 7:
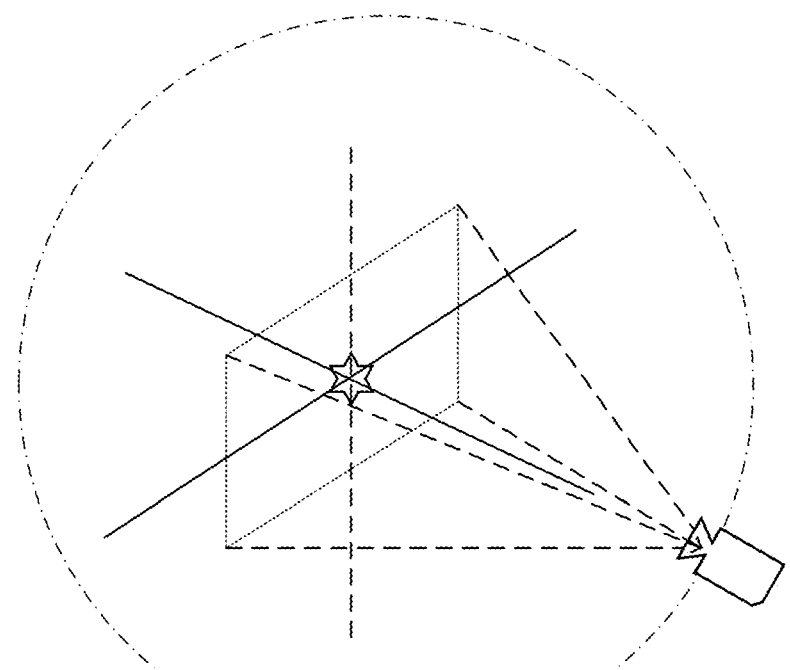
FIG. 7 schematically depicts a content observed by a virtual camera according to an embodiment of the present disclosure.

As shown in FIG. 6, the triangular surface model of the point cloud is constructed by adopting the 3D Delaunay algorithm. The specimen model is segmented along the contour of each sub-component. The number of faces of the specimen is compressed by performing the simplified algorithm for quadratic local mapping. The 3D faces of the surface of the specimen are registered with the panoramic image to generate the 3D surface model of the specimen with the image texture.

(2.3.1) Generation of 3D Surface Model

The triangular surface model of the point cloud data is constructed by adopting the 3D Delaunay algorithm. The effect is shown in FIG. 6. A surface structure and morphology of the specimen model are calibrated using the 3D editing interactive software. The 3D surface model of the specimen is segmented along its boundary contour to form sub-components of individual components with different shapes.

(2.3.2) Compression of Triangular Faces on Specimen Surface

Considering that the triangular faces generated based on the point cloud are too large, and thus will affect speeds of real-time rendering and interaction, the triangular faces of the specimen model are simplified by performing the simplified algorithm for quadratic local mapping. A Gaussian sphere is created, the triangular faces are projected onto the Gaussian sphere according to normal vectors, the threshold value is set to merge and reconstruct the triangular faces, and the result is transformed back to the 3D space to compress the number of the triangular faces of the surface model of the specimen.

(2.3.3) Texture Mapping of Specimen Model

According to the panoramic image generated by the step (1.2.3), a corresponding relationship between a pixel of the panoramic image and the surface vertex is constructed by using a fixed geometric relationship between a spatial coordinate (X, Y, Z) of the surface vertex of the specimen and an imaging microscope to achieve mapping between the triangular faces of the surface and the panoramic image.

(3) Interactive Display of Microscopic Virtual Learning Resource (3.1) Setting of Observation of Specimen Model The 3D insect model is selected as an avatar of a learner in a virtual learning space in a process of constructing a virtual learning resource. The specimen model is viewed in the multi-angle and omni-directional manner from the third-person perspective. An optimal position is determined to observe the virtual learning resource according to parallax setting of a virtual scene. The microscopic virtual learning resource is dynamically updated.

(3.1.1) Creation of Virtual Avatar of User

The 3D insect model is selected as the avatar of the learner in the virtual learning space in the process of constructing the virtual learning resource. A virtual camera is created behind the 3D insect model. An observation point of the learner is bound to the camera, line of sight of the camera is kept on the avatar model and the virtual learning resource in the field of view is followed and observed.

(3.1.2) Setting of Observation Position

Figure 8:
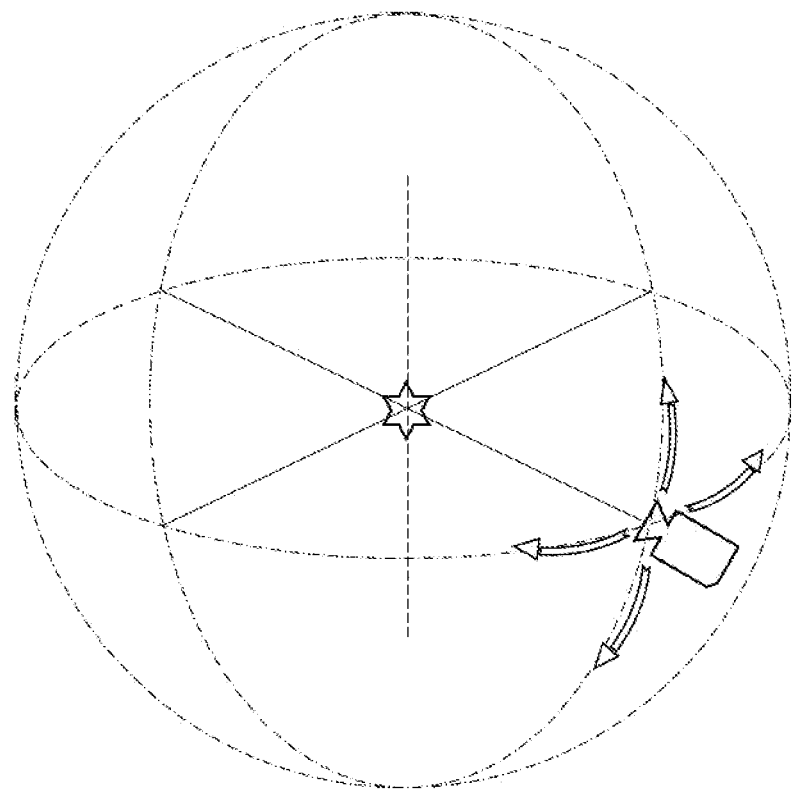
FIG. 8 is a schematic diagram of an optimal observation position of an avatar model according to an embodiment of the present disclosure.

An actual length, width and height of the specimen model are recorded in description of the virtual learning resource due to difference in category and size of specimen models. A position and a direction of the camera are set according to information (length, width and height) when the virtual scene is loaded to form the optimal position to observe the avatar model as shown in FIG. 8.

(3.1.3) Dynamic Update of Virtual Learning Resource

Figure 9:
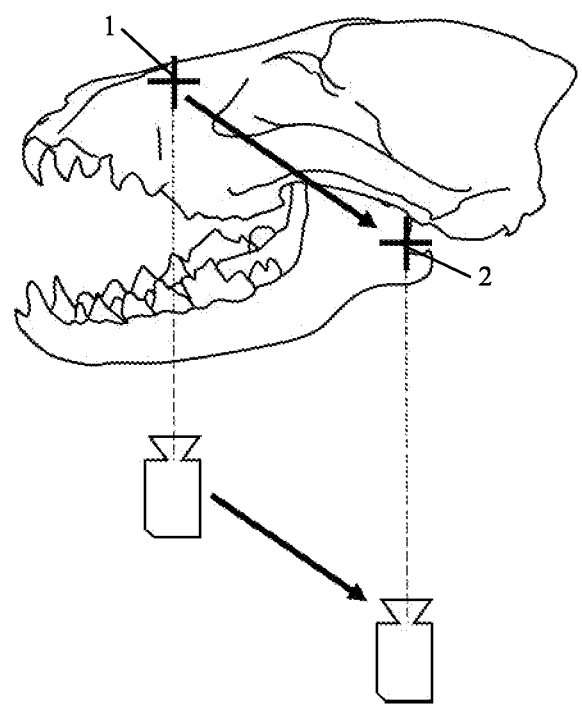
FIG. 9 schematically shows dynamical update of a position of a viewpoint according to an embodiment of the present disclosure, where position 1: a position before movement and position 2: a position after movement.

According to a task and a step, a position, gazing direction and field angle of the virtual camera are adjusted by the learner to update a position, orientation, posture and movement mode of the specimen model in real time in the field of view and dynamically update the specimen model in the virtual learning space. FIG. 9 schematically shows a viewpoint of the virtual camera moved to position 2 from position 1.

(3.2) Setting of Display Mode of Specimen Model

Annotations are added to different parts of the specimen model. Different annotation forms are set according to the sequence of the components and visual relationship. The display modes of single-sided transparency, cross-sectional display and components' hiding are adopted to display massive triangular faces generated by the specimen model.

(3.2.1) Setting of Annotation of Specimen Model

Figure 10:
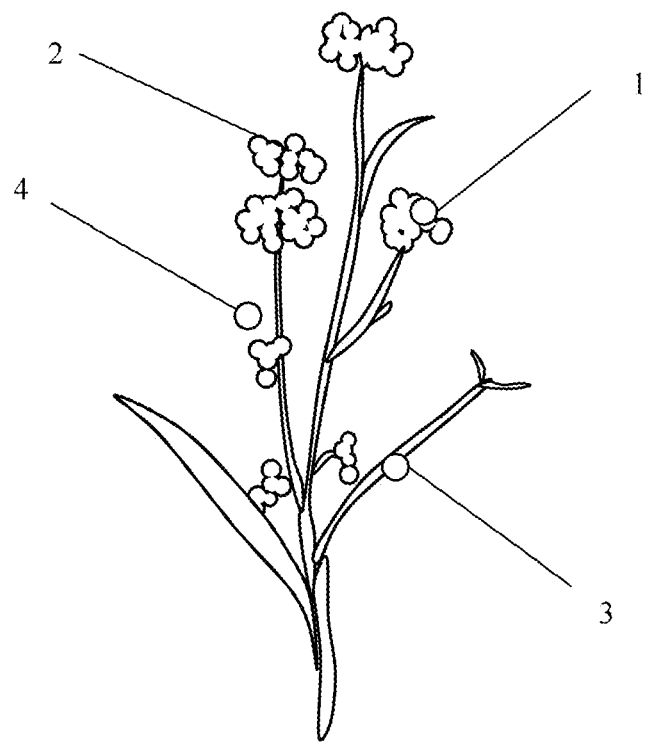
FIG. 10 is a schematic diagram of annotations for a small plant specimen according to an embodiment of the present disclosure, where 1: annotation 1; 2: annotation 2; 3: annotation 3; and 4: annotation 4.

In order to help the learner recognize and understand learning content, the specimen model is annotated with specific knowledge content in the process of constructing the virtual learning resource. As shown in FIG. 10, if there are multiple components of a plant required to be annotated, it is required to optimize an annotation sequence and visual relationship of the components according to the distance from the camera, so as to achieve a reasonable and orderly visual effect.

(3.2.2) Setting of Single-Sided Transparency

An Alpha channel is added to the texture image by increasing a transparency value of the texture of the specimen model. When an orientation of a triangular face of the specimen model is the same as that of the camera, an Alpha value of a texture of the triangular face is set to black, and Alpha values of other triangular faces are set to white, such that triangular faces blocking the field of view will be displayed transparently to facilitate user's observation and operation.

(3.2.3) Setting of Component' Hiding

In view of a situation in which a single-sided transparency setting is not applicable, the display mode of hiding of a subcomponent model of the specimen or the display mode of a cross-section model replacing the surface model is adopted to allow the learner to quickly browse the model in massive data scenes.

(3.3) Setting of interaction of specimen According to the actual structure of the specimen model, the specimen model is split into a plurality of functional components with different functions. The hierarchical relationship between individual functional components is reconstructed and morphology and structure of the individual functional components are displayed. The individual functional components are dynamically displayed layer by layer and segment by segment according to the stripping order from a root top and from outside to inside. A dynamic interactive display of joint orientation of the specimen is completed according to a rotation direction, a movement interval and an angular velocity of components involved in a movement.

(3.3.1) Splitting and Association of Specimen Components

Figure 11:
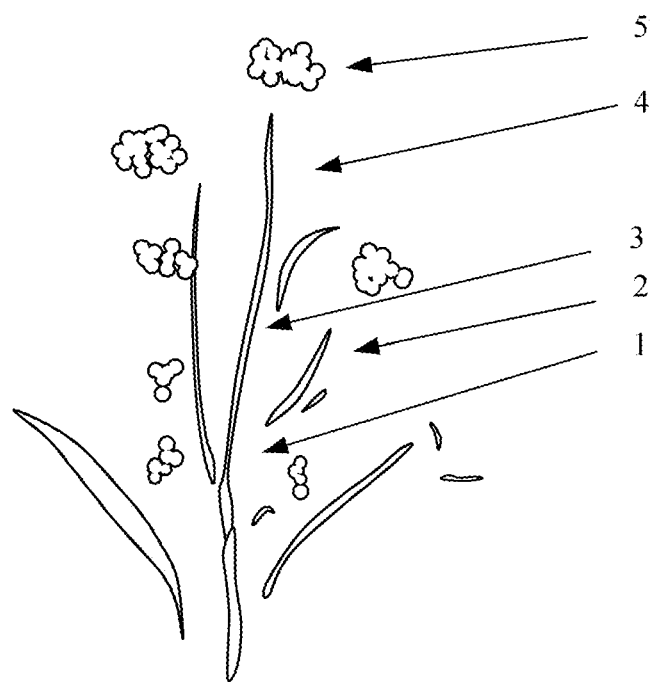
FIG. 11 schematically shows separation of the small plant specimen according to an embodiment of the present disclosure, where 1 and 3-4: different components of a main stem from bottom to top; 2: a branch; and 5: a flower.
Figure 12:
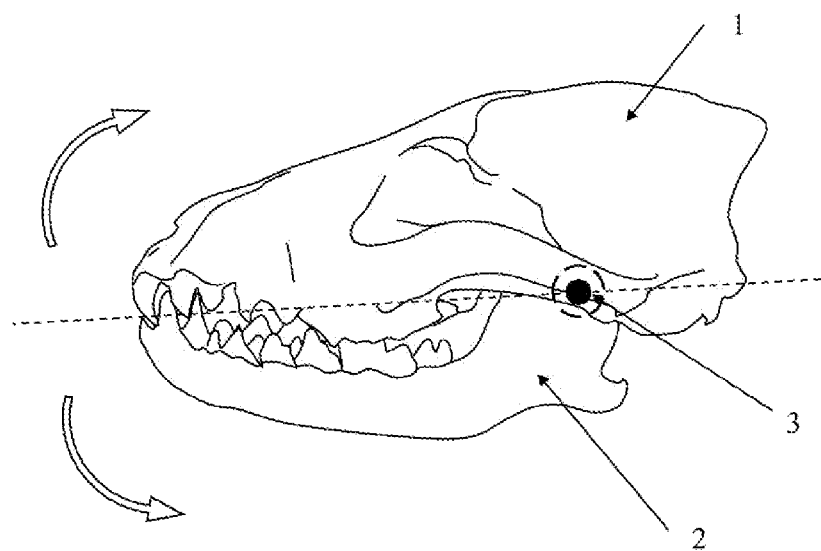
FIG. 12 is a schematic diagram of a hierarchical relationship according to an embodiment of the present disclosure, where 1: a parent bone; 2: a child bone; and 3: a joint.

The specimen model shown in FIG. 10 is split into the plurality of components with different functions shown in FIG. 11. A connection relationship between the components limits a range of a movement angle between the components. As shown in FIG. 12, the hierarchical relationship between individual functional components is reconstructed to form a joint motion structure of each component and display the morphology and the structure of each component.

(3.3.2) Display Sequence of Component

Each component is dynamically displayed layer by layer and segment by segment according to the stripping order from the root up and from outside to inside based on a growth law of the specimen referring to a relationship between each component and its parent and child components. Each component is displayed in a mode of the single-sided transparency or in a mode of cross-section.

(3.3.3) Dynamic Simulation of Specimen Component

Figure 13:
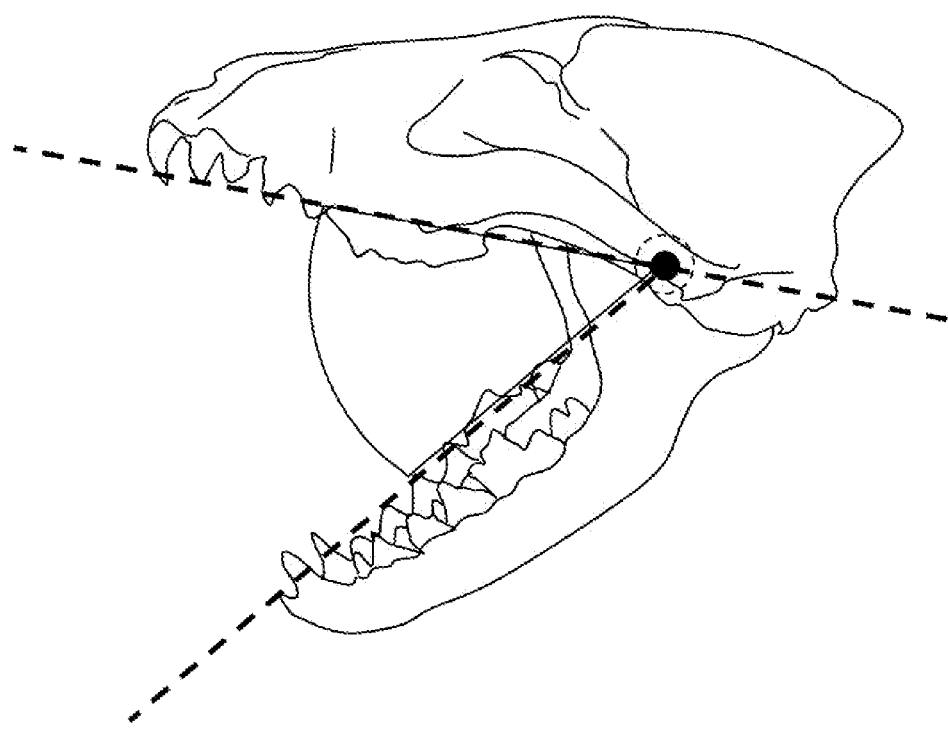
FIG. 13 is a schematic diagram of a hierarchy-based movement relationship according to an embodiment of the present disclosure.

As shown in FIG. 13, the angular velocity is substituted into the angle range between component links according to the rotation direction, the movement range and the angular velocity of the components involved in the movement to obtain a frequency of a reciprocating cycle. The dynamic interactive display of the joint orientation of the specimen is completed by constraining the rotation direction, an opening-closing amplitude and the frequency.

The partial content is not described in detail in this application, which is known to those skilled in the prior art.

Described above are only preferred embodiments of this application, and are not intended to limit this application. Any modification, replacement and improvement made by those skilled in the art without departing from the spirit and principle of this application shall fall within the scope of this application.

What is claimed is:

1. A method for generating a microscopic virtual learning resource, comprising:
(1) adopting a combination of ultra-depth-of-field three-dimensional (3D) microscopy and macro photography to realize framing and continuous image acquisition of a specimen to vividly reconstruct microscopic morphology and structure of a surface of the specimen; photographing the specimen from multiple angles according to requirements of overlapping photography, so as to realize registration and stitching of images based on an overlapping area to obtain a panoramic image of the surface of the specimen; describing collection information of the specimen in a form of metadata and naming the images of the specimen; organizing and managing image files of the specimen by using a pyramid image system to facilitate subsequent 3D reconstruction based on the images;
(2) matching and correcting the images of the specimen; calibrating a camera in a spatial scene; generating point cloud data of the specimen based on 3D image construction; removing noise points from a point cloud; allowing a spatial coordinate of the point cloud to be in one-to-one correspondence to a texture coordinate based on a direct linear transformation adjustment model; comparing a coordinate and a position of control points to check generation quality of the point cloud data; constructing a triangular surface model of the point cloud by adopting a 3D Delaunay algorithm; segmenting the specimen model along a contour of each sub-component, and compressing the number of faces by performing a simplified algorithm for quadratic local mapping; and registering a mapping relationship between a surface vertex and the panoramic image to generate a 3D surface model of the specimen with image texture; and
(3) selecting a 3D insect model as a user avatar; viewing different parts of the specimen model in a multi-angle and omni-directional manner from a third-person perspective in a virtual learning environment to support interactive display modes of single-sided transparency, cross-sectional display and components' hiding; setting different annotation display schemes according to a sequence of the components and visual relationship; splitting a model resource into functional components and restoring a hierarchical relationship between the functional components according to an actual structure; displaying morphology and structure of the specimen model according to an interaction task and step; and dynamically displaying each functional component layer by layer and segment by segment according to a stripping order from a root up and from outside to inside;
wherein the step (1) is performed through steps of:
(1.1) in order to vividly reconstruct the microscopic morphology and structure of the surface of the specimen, selecting a microscope according to an optical zoom and constructing a standard luminous environment; and adopting a high-torque and low-speed motor to control regular movements of an object stage, so as to realize the framing and the continuous image acquisition of the specimen;

(1.2) photographing the specimen from the multiple angles at a certain frequency according to the requirements of the overlapping photography using the ultra-depth 3D microscopy to ensure that there is an overlapping area between adjacent images; and performing registration of the images according to the overlapping area to obtain the panoramic image of the surface of the specimen; and (1.3) describing the collection information of the specimen images in the form of metadata; naming the specimen images according to a rotation angle of the object stage and a photographing position; and organizing and managing the image files of the specimen by using the pyramid image system to facilitate the subsequent image-based 3D reconstruction;

the step (2) is performed through steps of:

(2.1) organizing the image files of the specimen in a form of tile and automatically arranging all images in the spatial scene to complete calibration of the camera; according to feature points with the same name on adjacent images of the specimen, correcting the specimen images and calculating a parallax; and generating 3D point cloud data of the surface of the specimen according to a compression parameter using an iterative point cloud compression algorithm; wherein the iterative point cloud compression algorithm takes the morphology of the specimen and a density distribution into account;

(2.2) eliminating noise data by using a point cloud denoising algorithm based on local density; solving a coefficient of coordinate transformation between a space coordinate system and an image coordinate system based on the direct linear transformation adjustment model to obtain a mapping relationship between the 3D coordinate of the point cloud and the texture coordinate; and measuring coordinates and positions of the control points by using a 3D interactive software through the control points of the specimen; and checking the generation quality of the point cloud data;

(2.3) constructing the triangular surface model of the point cloud using the 3D Delaunay algorithm and segmenting the specimen model along the contour of each sub-component; compressing the number of faces of the specimen by performing the simplified algorithm for quadratic local mapping; and registering 3D faces of the surface of the specimen with the panoramic image to generate the 3D surface model of the specimen with the image texture;

the step (3) is performed through steps of:

(3.1) selecting the 3D insect model as an avatar of a learner in a virtual learning space in a process of constructing a virtual learning resource; viewing the specimen model in the multi-angle and omni-directional manner from the third-person perspective; and determining an optimal position to observe the virtual learning resource according to parallax setting of a virtual scene and dynamically updating the microscopic virtual learning resource;

(3.2) adding annotations to different parts of the specimen model; setting different annotation forms according to the sequence of the components and visual relationship; and adopting the display modes of single-sided transparency, cross-sectional display and components' hiding to display massive triangular faces generated by the specimen model; and (3.3) according to the actual structure of the specimen model, splitting the specimen model into a plurality of functional components with different functions; reconstructing the hierarchical relationship between individual functional components and displaying morphology and structure of individual functional components; dynamically displaying individual functional components layer by layer and segment by segment according to the stripping order from a root top and from outside to inside; and completing a dynamic interactive display of joint orientation of the specimen according to a rotation direction, a movement interval and an angular velocity of components involved in a movement;

the step (1.1) is performed through steps of:

(1.1.1) according to requirements for high-precision silicon and metal processing in chip manufacturing industry, selecting an industrial microscope with an optical zoom of 20-280 and an observation accuracy of 10 μm to meet requirements for observation of fine structure on the surface of the specimen;

(1.1.2) adopting a color temperature standard modeling lamp as a coaxial light source and using a flash cut-off technology to ensure light consistency, so as to achieve shadowless lighting effect and clearly show detailed texture on the surface of the specimen; and (1.1.3) driving, by the high-torque and low-speed motor, the object stage to move regularly on a slide rail composed of a gear structure and a screw, wherein a movement accuracy depends on a coupling ratio between gears, and reaches 1 μm;

the step (1.2) is performed through steps of:

(1.2.1) during movement of the object stage, photographing the surface of the specimen at a certain frequency from vertical, inclined and adjacent directions, respectively, wherein a certain overlapping area is required to be left between the adjacent images;

(1.2.2) according to requirements of the overlapping photography, adopting an ultra-depth 3D microscopic system to focus on different areas of the specimen by regularly moving the object stage, so as to collect information of microscopic details on the specimen in turn and obtain a series of images of the specimen; and (1.2.3) according to content of the overlapping area between the adjacent images, effectively registering a plurality of images of the specimen with different focal planes to stitch the adjacent images, thereby iteratively completing stitching of all images; and adopting a color equalization algorithm to generate the complete panoramic image of the specimen considering chromatic aberration of the images caused by different factors;

the step (1.3) is performed through steps of:

(1.3.1) storing a position, an angle and a magnification factor of each image file of the specimen during the photographing process in a database table; recording names and overlapping information of overlapping files in forward and left-right directions during a collection process; and updating description of overlapping information recorded in the image files adjacent to the overlapping files;

(1.3.2) according to a sequence of moving of the object stage, naming the image files of the specimen based on a sequence of a photographing position, a photographing angle and a magnification factor; regularly describing the image files to facilitate data preprocessing of subsequent matching of points with the same name in generation of the panoramic image and the point cloud, where the points with the same name are the same feature points in different images; and
(1.3.3) establishing a specimen image management system according to an order of magnification from large to small; and organizing and managing the specimen images with different magnifications by using the pyramid image system to realize the organization and management of the specimen images, wherein a small-scale image is at a top level and a large-scale image is at a bottom level;

the step (2.1) is performed through steps of:
(2.1.1) in the specimen image management system, selecting all specimen images and organizing all images in a form of tile to achieve matching of the specimen images; setting an accuracy parameter according to high, medium and low levels; performing an alignment operation to automatically arrange all images in a spatial scene to complete the calibration of the camera;
(2.1.2) considering a perspective transformation, a similarity transformation and a shear transformation between the feature points with the same name in the adjacent images, correcting the specimen images according to spatial position and similarity rule; and calculating the parallax between the adjacent images based on matching of a dense point of a window; and
(2.1.3) obtaining spatial coordinates of the feature points with the same name in a unified coordinate system; setting a compression parameter for generation of the point cloud according to five levels from low to high, consisting of ultra low, low, medium, high and ultra high; and generating the 3D point cloud data of the surface of the specimen by using the iterative point cloud compression algorithm, wherein the iterative point cloud compression algorithm takes into account the morphology of the specimen and the density distribution;

the step (2.2) is performed through steps of:
(2.2.1) constructing a topological relationship of the point cloud by using K-dimensional tree to determine an average value and a variance of K-nearest neighbor of each point; and setting a threshold value to eliminate the data of the noisy point, where occurrence of the noisy point in the generated point cloud is caused by shooting angle, mutual occlusion of components of the specimen and material and texture distribution;
(2.2.2) solving the coefficient and calculating the image coordinate of each point in the point cloud based on the direct linear transformation adjustment model by measuring coordinates of the control points in the space coordinate system and the image coordinate system and transformation of a row-column coordinate and a plane coordinate in the image coordinate system; and assigning a corresponding RGB values to individual points in the point cloud; and
(2.2.3) measuring a coordinate of the control points and distance and azimuth between the control points by using distance measurement function of the 3D editing interactive software; and determining a generation accuracy of the point cloud by comparing corresponding actual information of the specimen; and if the generation accuracy does not meet the requirements, looking for wrong parts; and if the point cloud data is incomplete, supplementing data of a missing part;

the step (2.3) is performed through steps of:
(2.3.1) constructing the triangular surface model of the point cloud data by using the 3D Delaunay algorithm; calibrating a surface structure and morphology of the specimen model using the 3D editing interactive software; and segmenting the 3D surface model of the specimen along its boundary contour to form sub-models of individual components with different shapes;
(2.3.2) considering that the triangular faces generated based on the point cloud are too large, and thus will affect speeds of real-time rendering and interaction, simplifying the triangular faces of the specimen model by performing the simplified algorithm for quadratic local mapping; creating a Gaussian sphere; and projecting the triangular faces to a two-dimensional plane and then projecting back to the 3D space to compress the number of the triangular faces of the surface model of the specimen; and
(2.3.3) according to the panoramic image generated by the step (1.2.3), constructing a corresponding relationship between a pixel of the panoramic image and the surface vertex by using a fixed geometric relationship between a spatial coordinate of the surface vertex of the specimen and an imaging microscope to achieve mapping between the triangular faces of the surface and the panoramic image;

the step (3.1) is performed through steps of:
(3.1.1) selecting the 3D insect model as the avatar of the learner in the virtual learning space in the process of constructing the virtual learning resource; creating a virtual camera behind the 3D insect model; binding an observation viewpoint of the learner on the virtual camera with line of sight directing to the avatar model; and allowing the observation viewpoint to follow the virtual camera to observe the virtual learning resource in a field of view;
(3.1.2) recording an actual length, width and height of the specimen model in description of the virtual learning resource due to difference in category and size of specimen models; and setting a position and orientation of the camera according to the length, width and height when the virtual scene is loaded to form an optimal position to observe the avatar model; and
(3.1.3) according to a task and a step, letting the learner update a position, an orientation, a posture and a movement mode of the specimen model in real time in the field of view and dynamically update the specimen model in the virtual learning space by adjusting the position, the gazing direction and a field angle of the virtual camera;

the step (3.2) is performed through steps of:
(3.2.1) in order to help the learner recognize and understand learning content, annotating the specimen model with specific knowledge content in the process of constructing the virtual learning resource; wherein if there are multiple components required to be annotated, it is required to optimize an annotation sequence and visual relationship of the components, so as to achieve a reasonable and orderly visual effect;
(3.2.2) adding an Alpha channel to the texture image by increasing a transparency value of the texture of the specimen model; and when an orientation of a triangular face of the specimen model is the same as that of the camera, setting an Alpha value of a texture of the triangular face to black and Alpha values of other triangular faces to white, such that triangular faces blocking the field of view will be displayed transparently to facilitate user's observation and operation; and (3.2.3) in view of a situation in which a single-sided transparency setting is not applicable, adopting the display mode of hiding of a subcomponent model of the specimen or the display mode of a cross-sectional model replacing the surface model to allow the learner to quickly browse the model in massive data scenes; and the step (3.3) is performed through steps of:

(3.3.1) splitting the specimen model into the plurality of functional components with different functions, wherein a connection relationship between the components limits a range of a movement angle between the components; and reconstructing the hierarchical relationship between individual functional components to form a joint motion structure of each component and display the morphology and the structure of each component;

(3.3.2) dynamically displaying each component layer by layer and segment by segment according to the stripping order from the root up and from outside to inside based on a growth law of the specimen referring to a relationship between each component and its parent and child components; or displaying each component in a mode of the single-sided transparency or in a mode of cross-section; and (3.3.3) substituting the angular velocity into an angle range between component links according to the rotation direction, the movement range and the angular velocity of the components involved in the movement to obtain a frequency of a reciprocating cycle; and completing the dynamic interactive display of the joint orientation of the specimen by constraining the rotation direction, an opening-closing amplitude and the frequency.

* * * * *